Nov. 28, 1944.  E. P. FORD  2,363,724
WIENER VENDING MACHINE
Filed July 5, 1941  2 Sheets-Sheet 1

INVENTOR.
EVERETT P. FORD
BY
Arlington G. White
ATTORNEY.

Nov. 28, 1944.　　　　　E. P. FORD　　　　　2,363,724
WIENER VENDING MACHINE
Filed July 5, 1941　　　2 Sheets-Sheet 2

INVENTOR.
EVERETT P. FORD
BY
Arlington L. White
ATTORNEY.

Patented Nov. 28, 1944

2,363,724

UNITED STATES PATENT OFFICE 2,363,724

WIENER VENDING MACHINE

Everett P. Ford, San Francisco, Calif.

Application July 5, 1941, Serial No. 401,069

4 Claims. (Cl. 219—19)

The invention, in general, relates to automatic food service units and more particularly relates to means for vending sanitary wrapped individual hot dog sandwiches.

While the preferred embodiment of the present invention is entirely suitable for handling, cooking and delivering food sandwiches of various types, it has been especially designed for vending cooked frankfurter sandwiches of the kind described and claimed in my co-pending application, Serial No. 370,031, entitled "Container for frankfurter sandwiches," filed December 13, 1940, the sandwiches being individually prepared and wrapped at a central plant and delivered to the hopper of the machine when the supply has been exhausted.

A primary object of the present invention is to provide an improved hot dog sandwich vending machine affording coin-actuated electrical circuits for cooking and delivering individual sandwiches, the machine being especially characterized by the inclusion of means for handling and cooking the sandwiches so that no metal prongs, electrodes or other parts pierce the sandwiches, thus positively eliminating the likelihood of contamination of the food and of endangering the health of the consumers.

Another object of my invention is to provide a machine of the aforementioned character which affords automatic delivery of thoroughly cooked wiener sandwiches upon the expiration of a predetermined time interval after a deposit of a coin.

A still further object of the present invention is to provide means in a machine of the indicated nature affording automatic setting up of sandwiches in a cooking unit immediately after the delivery therefrom of a cooked sandwich.

Another object of the invention is to provide an improved hot dog sandwich vending machine of the aforementioned character which affords automatic control upon an especially constructed hopper to insure unobstructed delivery of individual sandwiches to a cooking unit without the likelihood of piling up of the sandwiches or the clogging of the hopper.

A still further object of the present invention is to provide a vending machine of the aforementioned character which affords a positive lock of the coin chute to avoid admission of coins when no sandwiches are contained in the hopper of the machine or when the power supply fails.

A still further object of my invention is to provide a machine of the indicated nature which is housed in a compact cabinet that lends itself readily to variable and attractive design motifs.

Another object of the present invention is to provide an improved automatically operative hot dog sandwich vending machine embodying electrical control of cooking and delivery mechanism and characterized by a single, positive control upon electrical circuits to insure against the likelihood of injury to workmen when repairing or servicing the parts of the machine.

Other objects of the invention, together with some of the advantageous features thereof, will appear from the following description of a preferred embodiment of the invention which is illustrated in the accompanying drawings. It is to be understood that I am not to be limited to the precise embodiment shown, nor to the precise arrangement of the various parts thereof, as my invention, as defined in the appended claims, can be embodied in a plurality and variety of forms.

Referring to the drawings.

Figure 1:
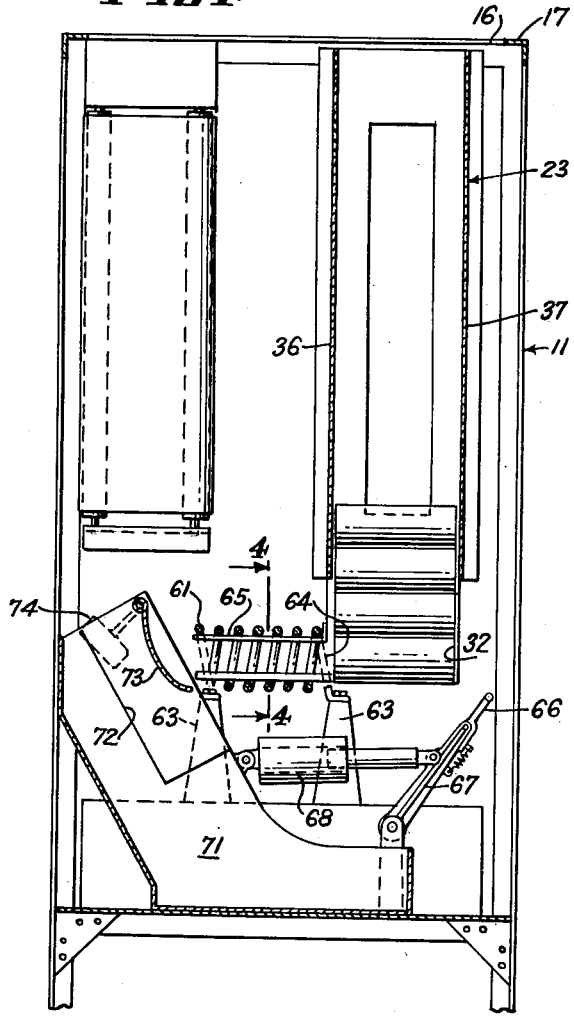
Figure 1 is a front sectional elevational view of a preferred embodiment of the invention.
Figure 2:
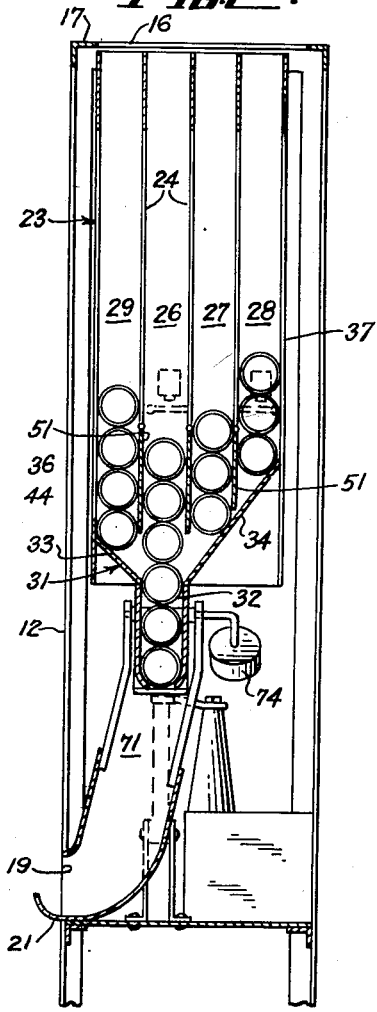
Figure 2 is a side elevational view of the embodiment of the invention shown in Figure 1.
Figure 3:
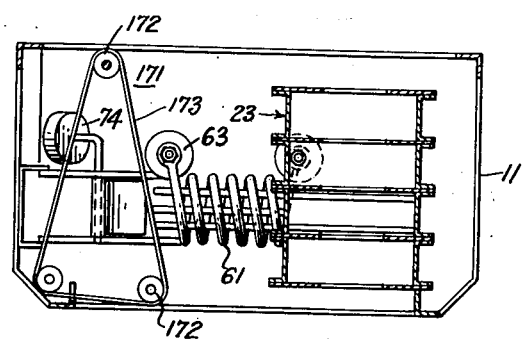
Figure 3 is a top view of the preferred embodiment of the invention, this view being taken on the line 3—3 of Figure 2.

In its preferred form, the automatically operable hot dog sandwich vending machine of my invention preferably comprises a sectional hopper for holding a plurality of individual, wrapped sandwiches in overlying relationship, an electric cooker supported below said hopper, means including a spring-controlled finger for moving individual sandwiches into said cooker at predetermined time intervals upon the expiration of a cooking period; said means simultaneously effecting the discharge of a cooked sandwich from said cooker as well as permitting the setting up of another sandwich for delivery into the cooker, means for recurrently energizing said cooker for a predetermined time interval, a coin chute for the reception of a coin, means including a timing mechanism in an electrical circuit and a switch in said coin chute for controlling the cooking period upon the deposit of a coin in said chute with sandwiches in said hopper, means in said hopper associated with said electrical circuit for controlling the movement of individual sandwiches to a cooker delivery station to avoid clogging of the hopper sections, and means for locking said coin chute against the reception of coins when no sandwiches are in the hopper or when the power supply fails.

As particularly illustrated in Figures 1–3 and 5 of the drawings, I provide an elongated, upright cabinet 11 which preferably is fabricated of metal and which includes a removable front door or panel 12 having a plurality of windows 13, 14 and 15 formed therein in order that the interior of the cabinet may be observed and for carrying desired advertising or instruction indicia; the cabinet also having an opening 16 in the top 17 thereof which is closed by a removable closure. The front door or panel 12 of the cabinet is so formed as to provide a coin slot 18 therein as well as a relatively wide, horizontally arranged recess 19 which forms a ledge 21 to which sandwiches are delivered when the mechanism hereinafter described is put into operation. Moreover, I conveniently provide an inner compartment, not shown, in the bottom of the cabinet 11 for the reception of refuse, such as used napkins and the like, which may be inserted through an opening 22 formed in the panel 12 and communicating with the aforesaid compartment.

Figure 4:
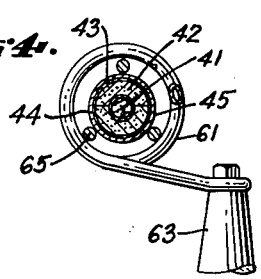
Figure 4 is an enlarged detail of a portion of the mechanism, partly in section, this view being taken on the line 4—4 of Figure 1.

In accordance with my invention, I fasten within the cabinet 11 adjacent to the top 17 thereof a sectional hopper which is generally designated by the reference numeral 23 and which is so arranged within the cabinet that the several sections underlie the opening in the top 17 of the cabinet and can be filled by removing the closure mentioned. Preferably, the hopper 23 is made to such dimensions that it has a capacity of fifty individual sandwiches and is divided by means of vertical partitions 24 into four sections or magazines 26, 27, 28 and 29 of which group the magazine 26 is of the greatest depth and magazines 27, 28 and 29 are of variable depths but all of less depth than magazine 26. It is to be appreciated that the width of each magazine is the same and is slightly greater than the outer diameter of the sandwich container hereinafter described. In order to provide the variable depths of the hopper magazines as well as to provide a cooker delivery station from which the sandwiches are moved into the cooker, I preferably so construct the bottom 31 of the hopper as to form therein a relatively deep recess or well 32 having an open bottom and which is in alignment with magazine 26 of the hopper and of the same width, as clearly shown in Figure 2 of the drawings. I also form the bottom 31 of the hopper with inclined, laterally extending portions 33 and 34 which are fastened at their one ends to the sides 36 and 37, respectively, of the hopper and which terminate at their other ends at the inlet or top of the well 32. Each hot dog sandwich is vended after first having been completely prepared at a central plant and delivered to the machine in quantities whenever the supply in the hopper becomes exhausted, and each packaged sandwich preferably comprises a frankfurter 41, an enveloping bun 42 around which a paper napkin 43 is folded, together with a tube 44 which encircles the frankfurter, the bun and the napkin; the tube 44 preferably being covered on its exterior or external surface with a sheet 45 of heat insulation and reflecting material, all as set forth and claimed in my aforementioned copending application and as shown in enlarged sectional detail in Figure 4 of the drawings.

The prepared, sanitary wrapped packages containing the hot dog sandwiches are loaded into the several magazines of the hopper from the top so as to be arranged in overlying relationship and, due to the well 32 which constitutes a continuation or extension of magazine 26, two individual sandwiches in their tubes 44 will be disposed one above another in the well 32 or bottom of magazine 26, such bottom of the well being herein termed the cooker delivery or loading station. While any size of hopper 23 can, of course, be utilized and is only dependent or limited by the dimensions of the cabinet 11, for the embodiment of the present invention depicted I have constructed the hopper to a size that it has a capacity of fifty individual sandwiches of which twelve are loaded into each of the magazines 27, 28 and 29 while fourteen are loaded into magazine 26 because of the well 32 therein. In the operation of the machine, the individual sandwiches are delivered from the hopper magazines in such succession that magazine 26 is first completely unloaded, and then the sandwiches are unloaded successively from the magazines 27, 28 and 29. The unloading of the magazines is controlled through the medium of doors 51 which are pivotally mounted on the bottom of each partition 24 and which are locked in a position in alignment with their corresponding partitions until unlatched by mechanism electrically controlled as hereinafter described.

In order that the hot dog sandwiches can be cooked in a minimum of time and thereafter promptly delivered to a patron of the machine, I preferably provide an electrical cooker which includes a high voltage coil 61 energized by a so-called short wave or diathermy unit 62 connected into an electrical circuit which is hereinafter explained, the short wave diathermy unit being conventional and not constituting, per se, my invention. The coil is supported on suitable electrical and heat insulation brackets 63 fastened within the cabinet 11 in such manner as to align the coil 61 with a side oulet 64 of the well 32 of the hopper 23 so that individual sandwiches may be moved directly into the coil; the hopper being provided with a plurality of lateral, horizontally disposed extensions 65 arranged in a circle and projecting into the coil 61 to guide the sandwiches to a proper seat within the coil. The well 32 is open at both sides, as well as at the bottom, not only to permit the passage of the sandwiches out of the well laterally into the coil 61 but also to permit a finger 66, which is pivotally mounted on a lever 67, to pass through the well and push the sandwiches into the coil. Lever 67 is movable in one direction by the action of a magnet or plunger of a solenoid 68 which is connected into an electrical circuit hereinafter explained, and the lever is urged in the opposite direction to its normal or initial position by the influence of a spring 69 anchored between the lever and any suitable support. A suitable spring 70 also is connected between the lever 67 and the finger 66 carried thereon so that the finger 66 will return to a position where it will effectively push the sandwiches from the well 32 into the coil upon the completion of each cooking period. The action is such that when the magnet 68 is energized the lever 67 is attracted and the finger 66 thereon engages and pushes a sandwich into the coil 61 from well 32; the finger being bent downwardly to ride under the successive sandwich entering the cooker delivery station on the return movement of the lever to its normal position when the magnet is de-energized; this action requiring only a matter of seconds to complete.

It is to be understood that for successful operation of the machine, the coil 61 must be primed with a sandwich to start the action or prior to the insertion of a coin and that, upon being cooked for a predetermined time interval, the succeeding uncooked sandwich which is moved into the coil by the action of lever 67 effects the discharge of the cooked sandwich to the customer. To the end that the cooked sandwich is effectively delivered, I provide a sandwich delivery chute 71 extending from adjacent the outlet end of coil 61 to and communicating with the recess 19 of the door 12 so that the cooked sandwich is deposited upon the ledge 21. I also provide a recess or cut-out portion 72 in the chute 71 which is lined with heat insulation and electrical insulating material, such as "Bakelite" or the like, to avoid the hazard of transmission of high voltage current from the coil to the chute. Moreover, I provide a door 73 at the entrance to the chute 71 which conveniently is urged to a closed position under the influence of a counter-weight 74 in order to prevent access to sandwiches within the coil 61, and thus prevent the likelihood of injury from contact with the high voltage coil and resulting heat to those who may surreptitiously attempt to obtain a sandwich therefrom.

In addition to the foregoing elements, the improved hot dog sandwich vending machine of the present invention is equipped with a conventional coin selector 76 which is supported within the cabinet 11 adjacent to the coin slot 18 of the door 12, together with a coin receiving chute 77 extending between the coin slot 18 and the coin selector 76; and a coin return chute 78 leading from an outlet of the coin selector to the recess 19 of the door so that a rejected coin will be deposited on the ledge 21. Coin selectors of the type included in the embodiment depicted are available on the open market and are so constructed that a coin of legal tender will strike a deflector plate, not shown, and bound directly into a vertically disposed passage 79 leading from an outlet of the coin selector 76 to a coin box 80 mounted below the selector and, in so doing, the coin momentarily closes an electrical circuit hereinafter explained. Coins which are not legal tender, and known as slugs, will not bound from the deflector plate but will roll off the same and enter the coin return chute 78 to be returned to ledge 21 and thus the aforementioned electrical circuit will not be closed.

Figures 5, 6, 7:
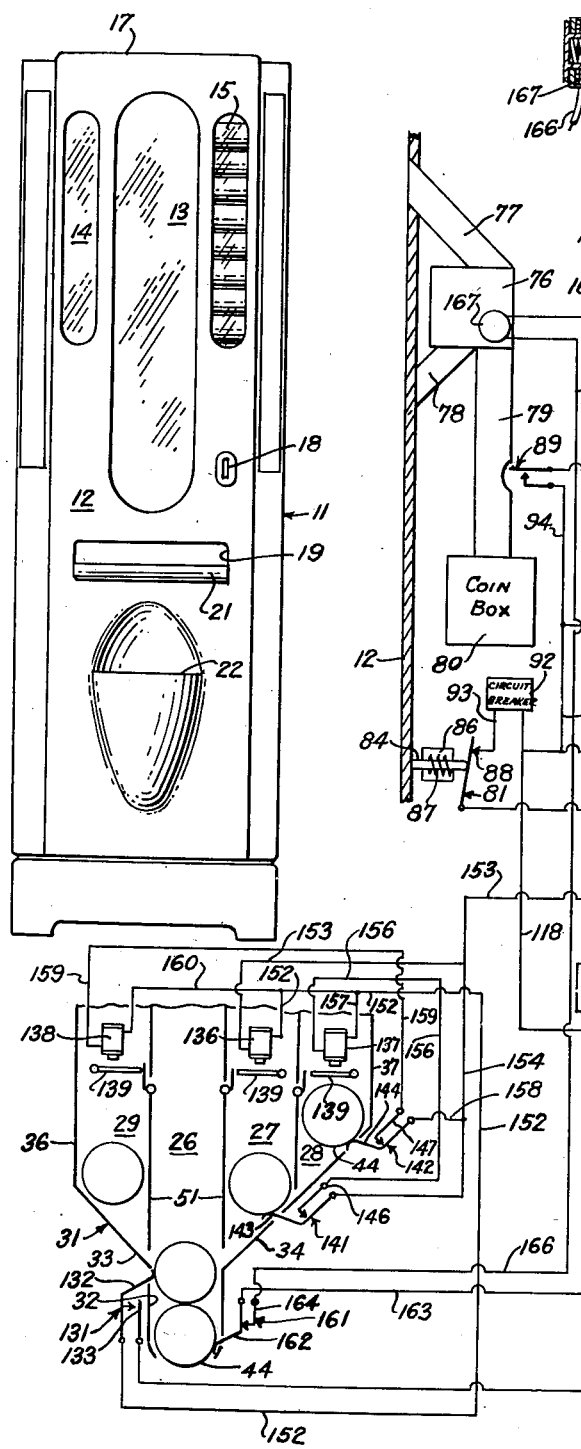
Figure 5 is a front elevational view of a preferred embodiment of the invention.
Figure 6 is a diagrammatic wiring diagram of the various electrical circuits employed in the preferred embodiment of the invention, this view including a showing of a portion of the hopper upon which control switches are mounted, together with the electrical circuits controlling such switches.
Figure 7 is an enlarged detail of a solenoid or magnet controlling the coin admission chute of the machine.

In accordance with my present invention, I provide an electrical system including a number of circuits for effecting the prompt delivery of sandwiches to the cooker coil 61; for operating a timing mechanism so that sandwiches will be cooked for a definite time interval; for unlatching the doors of the several hopper magazines in proper sequence to permit effective delivery of individual sandwiches to the cooker loading station; for effectively blocking the coin chute 79 to prevent setting up of the several electrical circuits when no sandwiches are in the hopper 23 or when the power supply fails; and for operating mechanism controlling advertising display. The various circuits, together with the elements thereof, are diagrammatically illustrated in Figure 6 of the drawings and it is to be especially noted that the main control switch of the electrical system is under the positive control of the door 12 of the cabinet so that whenever the door is closed the electrical system is set up for operation, and whenever the door 12 is open the machine is dead electrically. With reference to Figure 6, it will be observed that the system includes a main switch 81 which is interposed in a main alternating current supply circuit including lines 82 and 83 leading from a source of alternating current, not shown. In the present embodiment of the invention, the switch 81 conveniently consists of a resilient strip carrying a contact, and the switch is so mounted that it is urged to a closed position by the action of a pin 84 slidably mounted in a sleeve 86 which is supported adjacent to the switch; the pin 84 being encircled by a spring 87 confined within the sleeve. The pin normally projects beyond the frame of the cabinet 11 so that when the door 12 of the cabinet is shut the pin is moved into engagement with and bends the switch 81 to an extent that the contact thereon engages a stationary contact 88 to close the main circuit; this action causing the compression of coil spring 87. Upon opening the door 12 for any reason, the pin 84 retracts to its normal position under the influence of the tensioning of coil spring 87, and the resilient strip switch 81 returns to its initial position thus breaking the main circuit. In accordance with the present invention, the main circuit includes a resilient strip switch 89 which is mounted in passage 79 in the path of coins dropping therethrough to the coin box 80 so that the switch 89 will be momentarily closed upon the passing of each coin dropped through passage 79. Also included in the main circuit is a double pole magnetic relay 91, the magnet of which is energized upon the actuation of the coin-controlled switch 89. I also provide a conventional circuit breaker 92 in the main circuit in order to protect the electrical elements against circuit overloading, such circuit breaker being available in the desired capacity in the open market. The main circuit, hence, includes a line 93 from main switch contact 88 to the circuit breaker 92, a line 94 between the circuit breaker and the resilient coin-actuated switch 89 in passage 79, a line 96 from switch 89 to the coil 97 of the magnetic relay 91, and a line 98 from the coil 97 of the relay to the main feed line 83.

It will be observed, upon inspection of the showing of Figure 6 of the drawings, that the energization of magnet coil 97 by the momentary closing of the coin-actuated switch 89 closes the relay switch 91 and simultaneously closes several relay circuits including a relay holding circuit which preferably is controlled by a mercury switch 101 fastened on a swingable arm 102 of and extending from a conventional counter unit 103 which registers the number of sandwiches delivered from the machine. This relay holding circuit can be traced from switch 89 through lead 96 and a line 104 connected to a contact 106 of a first pair of contacts on relay switch pole 91, thence from the other of the first pair of contacts, designated by the reference numeral 107, through a line 108 leading to one side of the mercury switch 101, and thence from the other side of switch 101 through a lead 109 and line 94 back to the coin-actuated switch 89. A cooker relay circuit also is closed upon the closing of the relay 91, and the cooker circuit can be traced from the switch 89 through lead 96, coil 97 and a lead 111 to a contact 112 of a second pair of contacts of the relay switch pole 91, thence from the other contact 113 of the second pair of contacts through a lead 114 to one side of the cooker unit 62 which, per se, forms no part of my invention but is purchasable in the open market and comprises an amplifier tube 116, a rectifier tube 117 for converting the alternating current to direct current, as well as a step-up transformer, not shown, capable of impressing a rectified direct current voltage of approximately 5,000 volts, more or less, upon the cooker coil 61; the cooker circuit including a line 118 from the other side of the unit 62 leading back through line 94 and thence to the switch 89. I also provide across the cooker relay circuit, a cooker timing control mechanism circuit comprising an electric clock motor 121 of the standard type which is connected to and rotates a disc 122 from the face of which projects a stud 123 for the purpose hereinafter explained, the aforementioned parts being so constructed and connected as to provide for the revolution of disc 122 once in approximately 25 seconds, more or less, or as desired. The connections between clock motor 121 and disc 122 preferably include a friction wheel adjustably mounted on the motor shaft, all not shown, so that the speed of revolution of disc 122 may be regulated at the will of the operator in order to compensate for differences in potential and cycles of current at the various locations that the machine may be stationed. The average time interval for effecting the complete cooking of an individual sandwich at the voltage above mentioned is approximately 25 seconds. This timing mechanism circuit includes a tap line 124 leading from line 114 to one side of the motor armature and a tap line 125 leading from the other side of the motor to line 118, as clearly shown in Figure 6 of the drawings.

In addition to the foregoing circuits, I provide a relay circuit which includes the mechanism for feeding the sandwiches into coil 61 and for effecting the discharge therefrom of a cooked sandwich. This last mentioned relay circuit includes the lever control solenoid or magnet 68 as well as a second mercury switch 126 which likewise is mounted on the arm 102 of the counter unit 103, and the circuit can be traced from switch 89 through line 96 to the magnet coil 97 of the relay 91, thence from the magnet coil 97 through a line 127 to one side of the mercury switch 126, thence from the other side of such switch through line 128 to the magnet 68 which operates lever 67, and thence from the magnet 68 through a tap line 129 and line 118 through line 94 back to the switch 89. It may be observed here that mercury switch 126 is adjustable to any selected one of a plurality of positions with respect to mercury switch 101 which, as stated, also is fastened to arm 102 of counter unit 103; and it also is to be observed that I provide a length of wire 130 on and extending from mercury switch 101 which projects into the path of the stud 123 of disc 122 which is rotated by clock motor 121. The operation is such that when stud 123 strikes the wire 130, the arm 102 of counter unit 103 is moved to tilt the switches 101 and 126 against the influence of a spring, not shown. Tilting of switches 101 and 126 momentarily first closes the feeding mechanism relay circuit in which switch 126 is contained, while the rebound of the switch 101, due to the action of the aforementioned spring, immediately thereafter breaks the relay holding circuit containing switch 101 to de-energize all of the relay circuits; the switch 101 returning to its normal or initial position so as to place or condition the relay holding circuit for energization again when another coin is dropped through the passage 79 on its way to the coin box 80. It is to be understood that other means can be employed for momentarily closing the sandwich feeding mechanism relay circuit just prior to the breaking of all relay circuits.

Summarizing the action which occurs upon the feeding or dropping of a coin of legal tender and of the proper value into coin slot 18 which thereafter drops through passage 79, it will be clear that the first action is the closing of switch 89 and the immediate closing of the relay 91 together with the relay holding circuit containing mercury switch 101. Simultaneously with the closing of the relay holding circuit, the cooker unit circuit is energized as well as the timing mechanism circuit including electric clock motor 121 which initiates the rotation of the timer disc 122. When stud 123 of the disc 122 strikes the projecting wire 130 of mercury switch 101, which occurs approximately 25 seconds, more or less, after the coin is dropped and switch 89 closes, the arm 102 of counter unit 103 moves to tilt the switches 101 and 126. The tilting of these switches closes the sandwich feeding mechanism relay circuit containing solenoid 68 which pulls lever 67 toward the same causing finger 66 on lever 67 to engage and push a succeeding sandwich into high voltage coil 61, this action effecting the displacement of the cooked sandwich into delivery chute 71 so as to pass the cooked sandwich to ledge 21 of door 12. The return movement of arm 102 of the counter unit to its initial position effects a breaking of the relay holding circuit and, of course, opens all relay circuits so as to stop the operation of the cooker unit 62, the clock motor 121 as well as the de-energization of the magnet 68 so that lever 67 is returned to its initial position under the influence of the spring 69; although switch 101 is immediately set up so that the relay holding circuit is immediately closed when the next coin is dropped through passage 79 to close switch 89, whereafter the foregoing cycle is repeated assuming, of course, that additional sandwiches are available in the hopper and that the power supply line has not failed.

In addition to the foregoing circuits, the electrical system embraced in the present embodiment of my invention which is illustrated in the accompanying drawings includes a plurality of auxiliary circuits for controlling the delivery of sandwiches from the various sections or magazines of hopper 23 in proper sequence and without likelihood of clogging the hopper. These aforementioned auxiliary circuits, together with their attendant switches and operating elements, are particularly illustrated schematically in the lower left hand portion of Figure 6 of the drawings. It will be observed therefrom that I provide a switch 131 adjacent to the top of well 32 of the hopper which includes a resilient arm 132 carrying a contact, the arm extending through an opening in the wall of well 32 so that a portion of the arm lies in the path of sandwiches entering the well. When the well is full, or contains two sandwiches, the arm 132 of switch 131 is pressed and held outwardly to maintain the switch 131 open. As the top sandwich of any two sandwiches in well 32 drops to the bottom of the well, the arm 132 is released and the contact thereof engages a stationary contact 133 to close switch 131 as well as the circuit in which it is contained. The circuit containing switch 131 also includes three magnets or solenoids 136, 137 and 138 which are electrically connected in series, as shown, and which are mounted adjacent to the magazines 27, 28 and 29, respectively, of the hopper 23. Associated with each of the magnets 136, 137 and 138 is a pivotally mounted arm or bar 139, and each arm is so arranged that when the said magnets are not energized the arms will be engaging the doors 51 on partitions 24 of the hopper to latch such doors against movement.

These auxiliary circuits controlling the delivery of the sandwiches from the magazines also include a pair of similar switches 141 and 142 which are mounted on the laterally extending portion 34 of the inclined hopper bottom underneath the hopper sections 27 and 28, respectively; such switches being held open by the bottom sandwich in each of such magazines but closing when the last sandwich therein is released. The switches 141 and 142 correspond to switch 131 in that each includes a resilient arm 143 and 144, respectively, carrying an electrical contact, and the arms extend through suitable openings in portion 34 of the hopper bottom so as to lie in the path of sandwiches in the bottoms of magazines 27 and 28, respectively. Consequently, when a sandwich lies at the bottom of these magazines, the switches 141 and 142 are held open by virtue of the weight of the sandwiches urging the arms 143 and 144 thereof outwardly to maintain such arms out of engagement with stationary contacts 146 and 147 of the switches 141 and 142, respectively. When the last sandwich leaves magazine 27, switch 141 closes and, correspondingly, when the last sandwich leaves magazine 28, the switch 142 closes. Magnet 137, which is associated with the magazine 28, is in the circuit containing switch 141; the magnet 138, which is associated with magazine 29, is in the circuit containing switch 142; while the magnet 136, which is associated with the magazine or section 27 of the hopper, is in the circuit containing control switch 131. The action is such that when switch 131 is closed by the passing of the next to the last or top sandwich in well 32, the magnet 136 is energized and it attracts its associated bar 139 so as to unlatch the pivoted door 51 on the partition between magazines 26 and 27 allowing such door to swing into the magazine 26 by the weight of the sandwiches from magazine 27 which are normally held therein by reason of the fact that the aforementioned door is normally held closed by the bar associated with magnet 136. Since the door 51 is of such dimensions that it spans the magazine 26 transversely when opened, the sandwiches from magazine 27 can not back up into the magazine or section 26 but, rather, the sandwiches roll down the inclined portion 34 of the hopper bottom to enter the well 32; this action occurring immediately after the next to the last sandwich of the magazine 26 has dropped to the bottom of the well 32 momentarily to effect the closing of switch 131 which is almost immediately re-opened when the first sandwich entering well 32 from magazine 27 strikes the resilient arm 132 of switch 131.

Correspondingly, when the last sandwich of the magazine 27 leaves the same, the switch 141 is closed to effect the energization of the magnet 137, associated with hopper section 28, thereby attracting the arm or bar 139 thereof and unlatching the door 51 between magazines 27 and 28. As in the former case, the last mentioned door is of sufficient width to span the magazine 27 transversely and prevent sandwiches from backing up into such section. As a result, the sandwiches empty from hopper magazine 28 into the well 32 one at a time. Thus, before the last sandwich from magazine 27 has been removed from the well 32, a sandwich from the section 28 enters the well to open switch 131 again. Similarly, when the last sandwich leaves hopper magazine 28, the switch 142 at the bottom thereof closes to effect the energization of magnet 138 which is associated with hopper section 29. As a result, the arm or bar 139 which is attracted by magnet 138 unlatches the door 51 between the sections 26 and 29 to permit the sandwiches from the latter section to pass and roll down the inclined portion 33 of the hopper bottom into the well 32; the door 51 between these sections 26 and 29 likewise being moved across the section 26 to prevent any sandwiches from backing up thereinto. When the first sandwich from section 29 enters the well 32 it overlies the last sandwich that has entered the well from section 28 and, in such position, effects an opening of switch 131 again; such switch remaining open until the top of any two sandwiches passes the arm 132 thereof.

Tracing the circuits containing the switches 131, 141 and 142, it will be observed from the wiring diagram of Figure 6 of the drawings that the circuit containing switch 131 includes the line 82 leading from the alternating current source to connect with main control switch 81, thence through the circuit breaker 92, thence through line 118 and a line 151 tapped from line 118 to the stationary contact 133 of switch 131. This circuit then is traceable from the contact of arm 132 of switch 131 through a line 152 to one side of the magnet 136, thence from the other side of such magnet through a line 153 to the other side or line 83 leading to the alternating current source. Switch 141 is in a circuit across the lines 152 and 153, above mentioned, and includes the magnet 137; the movable contact of resilient arm 143 of switch 141 being connected by a line 154 to line 153, and the stationary contact 146 of switch 141 being connected by a line 156 to one side of the magnet 137 while the other side of the latter magnet is connected by a line 157 to line 152. Switch 142 is connected across lines 152 and 153 also and the circuit containing such switch includes the magnet 138. The connections for this circuit include a line 158 from the contact of resilient arm 144 of switch 142 to line 154 leading to line 153 and to one side or line 83 of the alternating current supply; a line 159 from the stationary contact 147 of the switch 142 to one side of the magnet 138; and a line 160 from the other side of the magnet 138 to line 152 which connects to the other side or line 82 leading to the alternating current supply through switch 131, lines 151 and 118, the circuit breaker 92 and the main switch 81.

In addition to the foregoing auxiliary circuits controlling the release of the sandwiches from the magazines of the hopper in a proper sequence, I also provide a circuit controlling the admission of coins into the coin box 80 when the hopper is depleted and is not refilled immediately after the removal of the last sandwich. This last mentioned circuit includes a switch 161 which is similar to the switches 131, 141 and 142 and which is mounted adjacent to the bottom of well 32 on the outer surface of one wall thereof; the switch 161 including a resilient arm 162 which extends through an opening in the wall of well 32 so as to project into the path of the sandwich nested in the bottom of the well. Whenever there is one sandwich in the well 32 resting on the bottom thereof, the switch 161 is held closed by the engagement of the sandwich with the arm 162 of the switch. When the last sandwich is moved out of the well 32, resilient arm 162 is released and switch 161 opens. The circuit containing switch 161 includes a line 163 which conveniently can be tapped at line 151 so as to receive current through line 82 leading from one side of the alternating current supply; the circuit being traceable through the main switch 81, circuit breaker 92, line 118 and line 151 to line 163 which is connected to the contact of the resilient arm 162 of the switch 161. To complete the circuit, stationary contact 164 of switch 161 is connected by a line 166 to one side of a magnet or solenoid 167 mounted in the coin selector 76, and the other side of this magnet is connected through line 168 and line 111 to the line 98 which connects to line 83 leading to the other side of the alternating current supply. As stated above, the energization of the magnet 167 causes a plate 169 to slide out of the path of the coins that are dropped to permit them to enter the passage 79. When the last sandwich has been removed from the well 32, switch 161 opens and magnet 167 becomes de-energized with the result that the plate 169 moves across the passage 79 to divert the coins thereafter into the return chute leading to the ledge 21 on the panel 12. When additional sandwiches are disposed in the hopper 23, the magazine 26 is first filled so as to load two sandwiches in overlying relationship in the well 32 as an initial step, the switch 161 being thereby immediately closed and, as a result, the aforementioned plate 169 is again returned to its initial position under the influence of the magnet 167 and the coins have an unobstructed path into and through passage 79.

In order to provide for attractive display advertising of the product, I conveniently provide within the cabinet 11 an advertising medium that is operable during the entire operation of the vending machine when the current is on. To this end, a compartment 171 is conveniently formed adjacent to the hopper 23 and suitable brackets are provided in which rollers 172 are journaled for receiving an endless sheet 173 upon which desired advertising indicia can be delineated. Means for driving the rollers conveniently can consist of a standard electric clock motor, not shown, which is included in an advertising control circuit connected across the lead lines 82 and 83 of the alternating current supply through the medium of a line 176 leading through the circuit breaker 92 and switch 81 to one side or the line 82 of the alternating current supply, and a line 177 tapped from line 98 connected to the other side or line 83 leading to the alterating current supply. Any number of lamps, not shown, can be interposed in the advertising control circuit so that the display may be seen at night. The compartment housing the clock motor and rollers for actuating the sheet 173, which is trained around the rollers 172, preferably is behind the window 14 of the door or panel 12 so that such advertising carried by sheet 173 is clearly visible from the exterior of the cabinet. If desired, colored lamps may be employed for contrast. It also is clear that one of the lamps that may be interposed in this advertising control circuit can be located behind the window 13 of the door 12 and that the window 13 can carry any suitable lettering for further advertising the sandwiches, such window preferably being fabricated of transparent material.

It is to be understood that the appended claims are to be accorded a range of equivalents commensurate in scope with the advance made over the prior art.

I claim:

1. An automatically operable hot dog sandwich vending machine comprising a sectional hopper for holding a plurality of individually wrapped hot dog sandwiches in overlying relationship, an electric cooker supported below said hopper; said cooker including a high voltage, high frequency diathermy coil, a spring-controlled pivotally mounted finger for moving individual sandwiches from said hopper into said coil for cooking, an electrical circuit containing means for recurrently energizing said coil for predetermined time intervals, means in said circuit for effecting movement of said finger at predetermined time intervals to move the sandwiches into said cooker, and means in said hopper connected into said electrical circuit for controlling the delivery of individual sandwiches to a position for movement into said coil by said finger.

2. An automatically operable hot dog sandwich vending machine comprising a sectional hopper for holding a plurality of individually wrapped sandwiches in overlying relationship, an electric cooker supported below said hopper; said cooker including a high voltage, high frequency diathermy coil, a spring-controlled pivotally mounted finger for moving individual sandwiches from said hopper into said coil, an electrical circuit containing means for recurrently energizing said coil for predetermined time intervals, means in said circuit for recurrently actuating said finger at predetermined time intervals and means in said hopper connected in said electrical circuit for controlling the removal of sandwiches serially from the sections of said hopper so that sandwiches are completely removed from one hopper section prior to the removal of any sandwich from any other of said hopper sections.

3. An automatically operable hot dog sandwich vending machine comprising a cabinet, a hopper in said cabinet; said hopper including a plurality of separate, vertically disposed magazines each adapted to hold a plurality of individual sandwiches in overlying relationship for discharge therefrom by force of gravity to a precooking station, an electrical cooker supported in said cabinet below said hopper; said cooker including a high-voltage, high-frequency diathermy coil, a finger for moving individual sandwiches from said pre-cooking station into said coil, means for re-currently actuating said finger at predetermined time intervals and for re-currently energizing said coil for predetermined time intervals, means for controlling the discharge of sandwiches from said magazines of said hopper serially whereby all sandwiches are completely removed from one magazine prior to the removal of sandwiches from any other magazine to prevent clogging of the hopper, a door removably attached to said cabinet, and electrical means controlled by the placement of said door on said cabinet and the removal thereof therefrom whereby energization of said cooker and actuation of said finger are controlled.

4. In a wiener vending machine, a hopper including a plurality of partitions dividing the hopper into a plurality of vertically disposed magazines each of which is adapted to hold a plurality of sandwiches in overlying relationship; a generally V-shaped bottom on said hopper; said bottom including a well therein underlying and communicating with one of said magazines and also including inclined sections terminating at said well, a door hingedly connected to each of said partitions adjacent the bottom thereof, means detachably latching said doors in alignment with the partitions to which they are attached, and means for effecting the delivery of the sandwiches from said magazines serially without clogging the hopper, said means consisting of an electrical circuit including a main hopper switch having a resilient arm thereon extending into said well; said main hopper switch being held open by the weight of a sandwich in said well resting upon said resilient arm and being automatically closed when the sandwich is removed from said well, a plurality of magazine switches each having a resilient arm thereon extending within a magazine of the hopper; each of said magazine switches being held open by the weight of a sandwich resting upon the resilient arm thereof and being closed automatically when the last sandwich in said magazine leaves the magazine, and a plurality of magnets in said circuit operable serially upon the closing of said switches serially to actuate said means and unlatch said doors serially whereby sandwiches from said magazines are permitted to roll by force of gravity down the inclined sections of said bottom into said well.

EVERETT P. FORD.